United States Patent
Hu et al.

(10) Patent No.: US 6,289,793 B1
(45) Date of Patent: Sep. 18, 2001

(54) COOKING APPLIANCE

(75) Inventors: Michael G. Hu, Lockport, IL (US); Simon Ming-Jen Huang, San Gabriel, CA (US)

(73) Assignee: Tsann Kuen USA, Inc., Pasadena, CA (US)

(*) Notice: Subject to any disclaimer, the term of this patent is extended or adjusted under 35 U.S.C. 154(b) by 0 days.

(21) Appl. No.: 09/730,078

(22) Filed: Mar. 1, 2001

(51) Int. Cl.[7] ............................... A23L 1/00; A47J 37/00; A47J 27/00; B01F 7/16
(52) U.S. Cl. ............................... 99/332; 99/331; 99/348; 366/145; 366/146; 366/314; 366/601
(58) Field of Search ............................... 99/326–333, 348, 99/452–455, 460, 400, 444–446; 366/144–146, 314, 601, 292–301

(56) References Cited

U.S. PATENT DOCUMENTS

| | | | |
|---|---|---|---|
| 2,905,452 | * | 9/1959 | Appleton ............................... 99/348 |
| 4,417,506 | * | 11/1983 | Herbst et al. ............................... 99/348 |
| 4,693,610 | * | 9/1987 | Weiss ............................... 366/146 |
| 4,779,522 | * | 10/1988 | Wong ............................... 99/348 |
| 4,802,407 | * | 2/1989 | Negri et al. ............................... 366/145 |
| 5,031,518 | * | 7/1991 | Bordes ............................... 366/314 X |
| 5,048,402 | * | 9/1991 | Letournel et al. ............................... 99/331 X |
| 5,768,978 | * | 6/1998 | Dorner et al. ............................... 366/601 X |
| 6,026,735 | * | 2/2000 | Waterworth ............................... 99/348 |

* cited by examiner

*Primary Examiner*—Timothy F. Simone
(74) *Attorney, Agent, or Firm*—Loyal McKinley Hanson

(57) ABSTRACT

A cooking appliance that facilitates preparation of dry packaged foods includes a base and a removable pot on the base. The base is adapted to rest upon a horizontal countertop surface as a support for other components of the cooking appliance. The base includes an electric line adapted to be plugged into a source of household electricity and an electric motor connected to the electric line. The pot is adapted to be placed removably upon the base for food preparation purposes and to be used apart from the base as a serving dish. An electric heating element is included for heating the pot when the pot is on the base using electric power from the electric line. A stirring mechanism on the pot is adapted to connect to the motor when the pot is placed on the base and to stir packaged foods within the pot using rotational power from the electric motor. The stirring mechanism of one embodiment includes a stirring element and an opposing blade that are so adapted that the stirring element rotates past the opposing blade in order that the stirring element and the opposing blade can cooperatively break up clumps of food between them. A temperature control, a timer, and a grease collection pan are also included on the base, together with a removably grease drain element in the pot.

8 Claims, 5 Drawing Sheets

COOKING APPLIANCE

BACKGROUND OF THE INVENTION

1. Technical Field

This invention relates generally to appliances for preparing foodstuffs, and more particularly to a cooking appliance that significantly facilitates reparation of packaged foods.

2. Description of Related Art

The term "packaged foods" refers to foodstuffs that are packaged dry for unrefrigerated storage and quick, convenient preparation. Products sold under the trademarks Hamburger Helper, Chicken Helper, Tuna Helper, and Rice-A-Roni provide a few examples. The simple convenience of adding water and heating has made such packaged foods popular and frequently used items in many households, and so improvements in their preparation are of interest.

Packaged foods typically include any of various dry combinations of rice, pasta, stuffing, macaroni, chili, vegetables, sliced potatoes, and/or hash browns in a six to eight ounce box or bag along with some seasoning. The cook combines the dry ingredients in a skillet with hot water and any other desired ingredients (e.g., cooked hamburger, chicken, or tuna) and then heats the mixture on the stove top for about 15–20 minutes while stirring the mixture occasionally. That basically completes preparation.

Convenient, yes. But the stirring requirement can be a problem. The cook must remain nearby and focused on cooking. Otherwise the ingredients may clump together and even burn. This observation applies just as well to other stir-while-heating foods.

Many a busy mom or other cook faced with hectic household activities around meal time would prefer to improve this aspect of cooking. Although some existing crock pots include a slow stirring mechanism, they are large and bulky and unsuited for packaged foods. Thus, a need exists for a better easy-stir way of preparing packaged foods and other such stir-while-heating meals.

SUMMARY OF THE INVENTION

This invention addresses the concerns outlined above by providing a cooking appliance that includes (i) a base with a motor, (ii) a pot on the base that is adapted to heat packaged foods electrically while on the base and to be removed from the base and set atop a table as a serving dish, and (iii) a stirring mechanism on the pot that is adapted to stir packaged foods in the pot under power of the motor when the pot is on the base. As a heating element heats ingredients of the pot, the motor rotates the stirring mechanism. After heating, the cook removes the pot from the base and carries it to the dining table for serving.

The stirring mechanism stirs the ingredients unattended. This frees the cook to focus more on other household activities. The pot is removable so that it also serves as a separate serving dish. No need to bring the whole appliance to the dining table. No need to transfer the contents of a skillet to a separate serving dish. A special stirring element, timer, and temperature control augment the foregoing, and components of the cooking appliance quickly disassemble for cleaning and reassemble for the next use.

To paraphrase some of the more precise language appearing in the claims, a cooking appliance constructed according to the invention includes a base and a pot. The base is adapted to rest upon a horizontal countertop surface as a support for other components of the cooking appliance. The base has an electric line adapted to be plugged into a source of household electricity and an electric motor connected to the electric line.

The pot is adapted to be placed removably upon the base for food preparation purposes and to be used apart from the base as a serving dish. An electric heating element is provided for heating the pot when the pot is on the base using electric power from the electric line. A stirring mechanism on the pot is adapted to stir packaged foods within the pot when the pot is on the base using rotational power from the electric motor.

The stirring mechanism of one embodiment includes first and second stirring elements, with at least the first stirring element being adapted to rotate under power of the motor. The first and second stirring elements are so adapted that the first stirring element rotates past the second stirring element in order that the first and second stirring elements can cooperatively break up clumps of food between them. A temperature control, a timer, and a grease collection pan are also included on the base, together with a grease drain in the pot.

Thus, the cooking appliance of this invention significantly facilitates preparation of packaged foods and other stir-while-heating foods. The following illustrative drawings and detailed description make the foregoing and other objects, features, and advantages of the invention more apparent.

DESCRIPTION OF THE PREFERRED EMBODIMENTS

Figure 1:
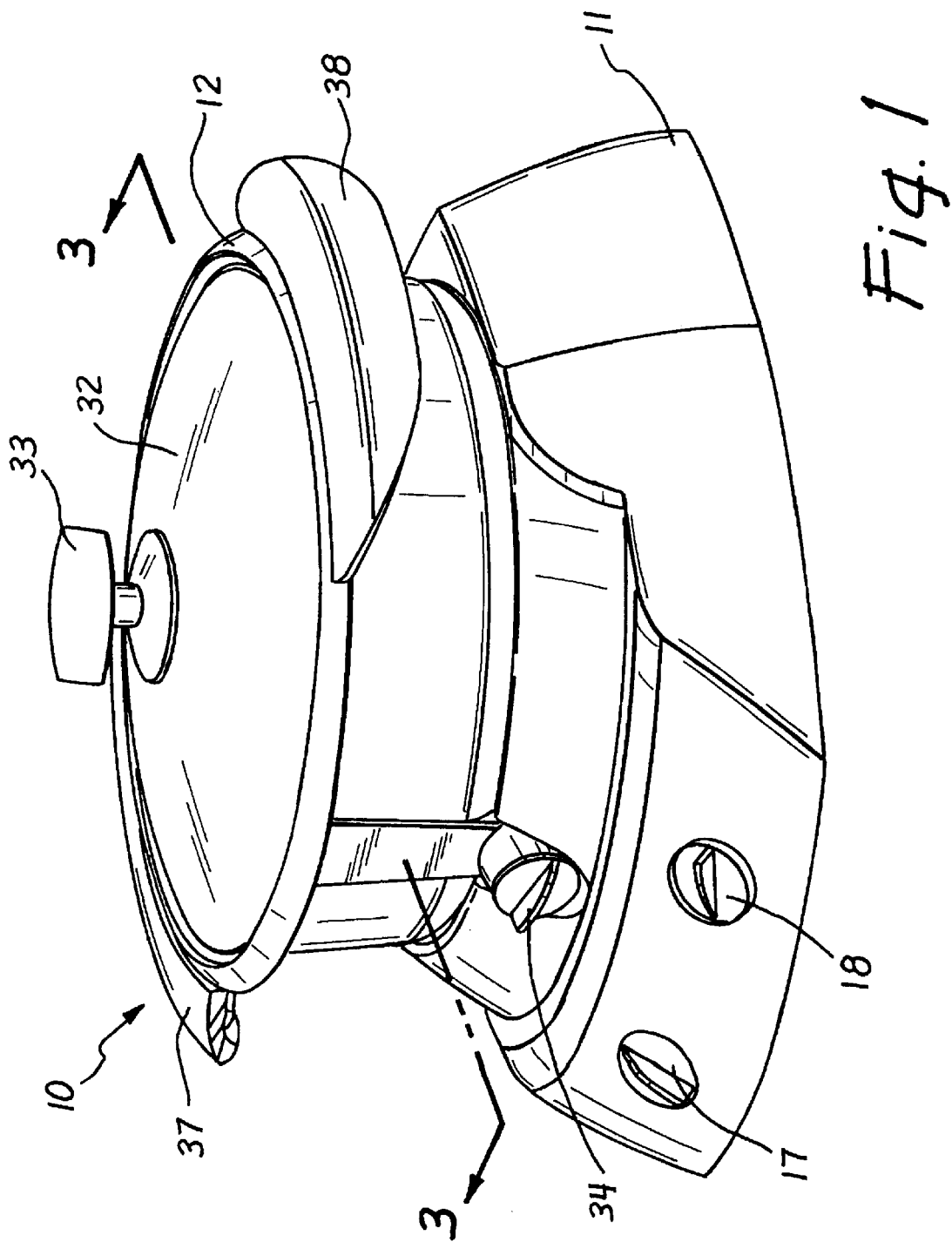
FIG. 1 of the drawings is an isometric view of a cooking appliance constructed according to the invention.
Figure 2:
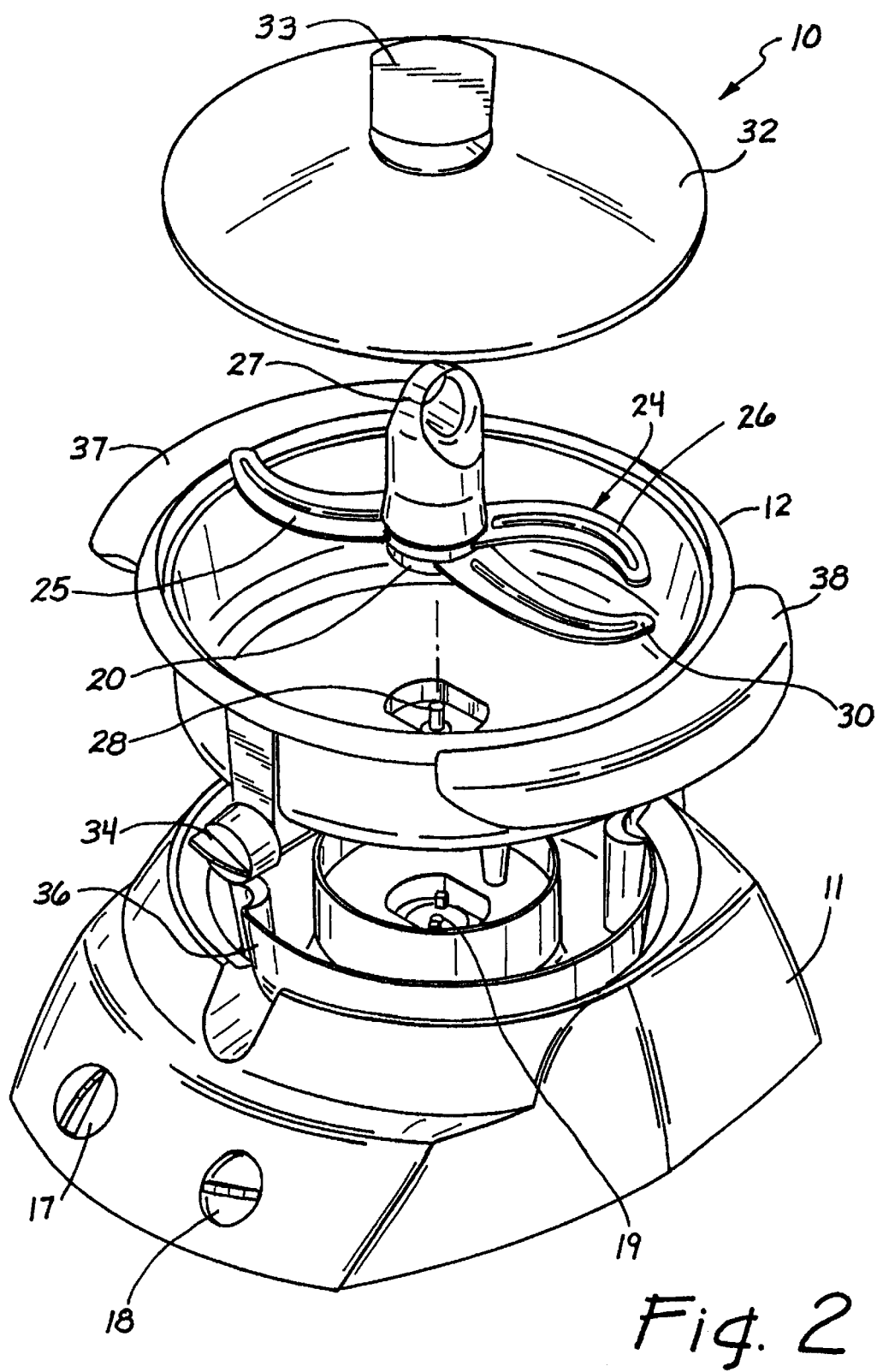
FIG. 2 is another isometric view of the cooking appliance with various components disassembled.
Figure 3:
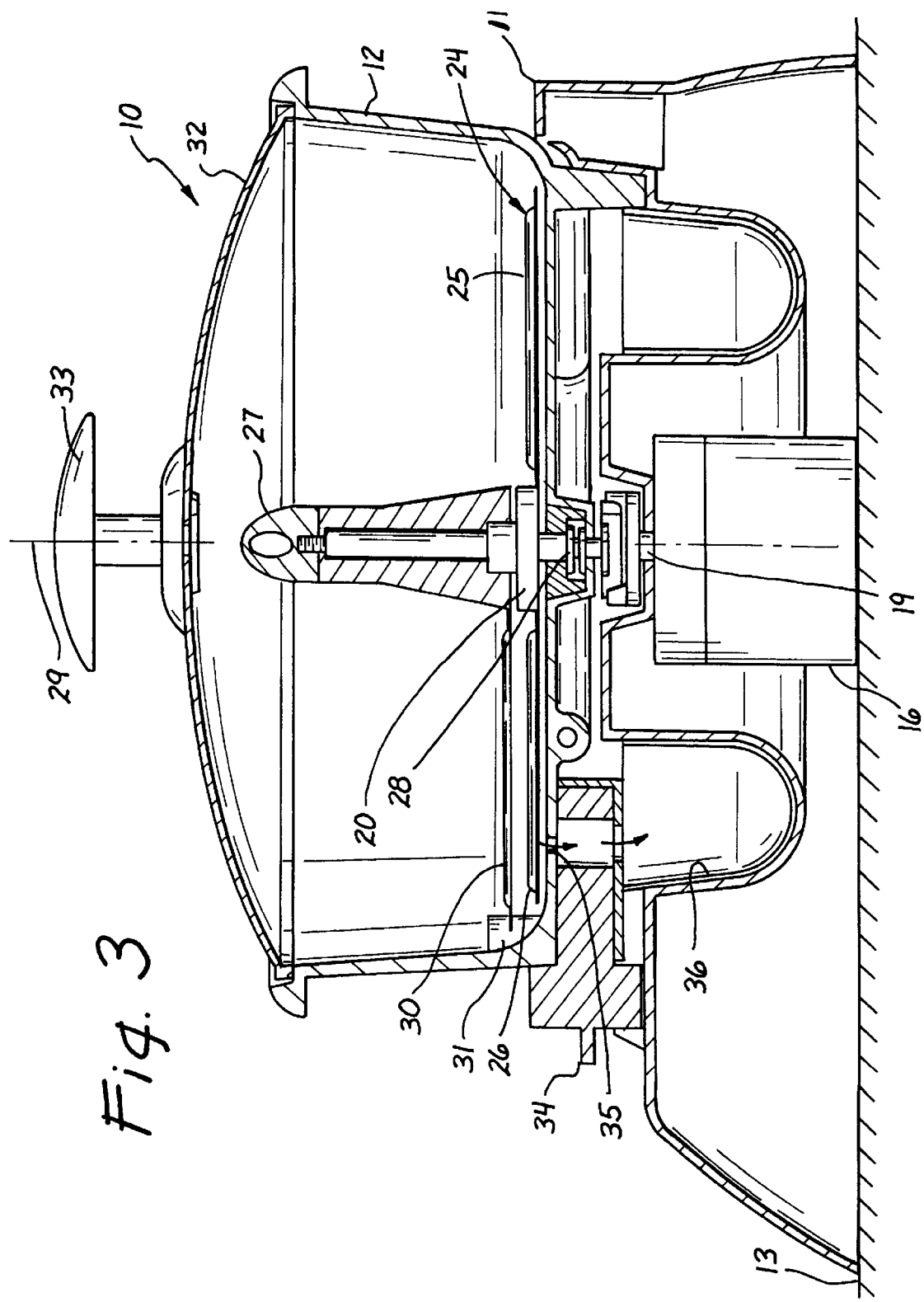
FIG. 3 is a cross sectional view taken on line 3—3 of FIG. 1.

FIGS. 1–5 of the drawings show various aspects of a cooking appliance 10 constructed according to the invention. Generally, the appliance 10 includes base 11 and a pot 12. The base 11 functions as means for supporting the pot 12 and other components of the cooking appliance 10 upon a horizontal countertop surface 13 (FIG. 3). The pot 12 functions atop the base 11 as means for holding foodstuffs as they are heated, and apart from the base 11 as a serving dish.

The base 11 is fabricated largely of plastic and suitably size to support the pot 12. The illustrated pot 12 (e.g., aluminum) is large enough to hold about two quarts, measuring about 3 inches deep, but pot size may vary without departing from the invention. The base 11 includes an electric line 14 (FIG. 5) that is adapted to be plugged into a source of household electricity with a conventional plug 15. It also includes an electric motor 16 (FIGS. 3 and 5) connected to the electric line 14, along with a timer 17 and a temperature control 18.

Figure 4:
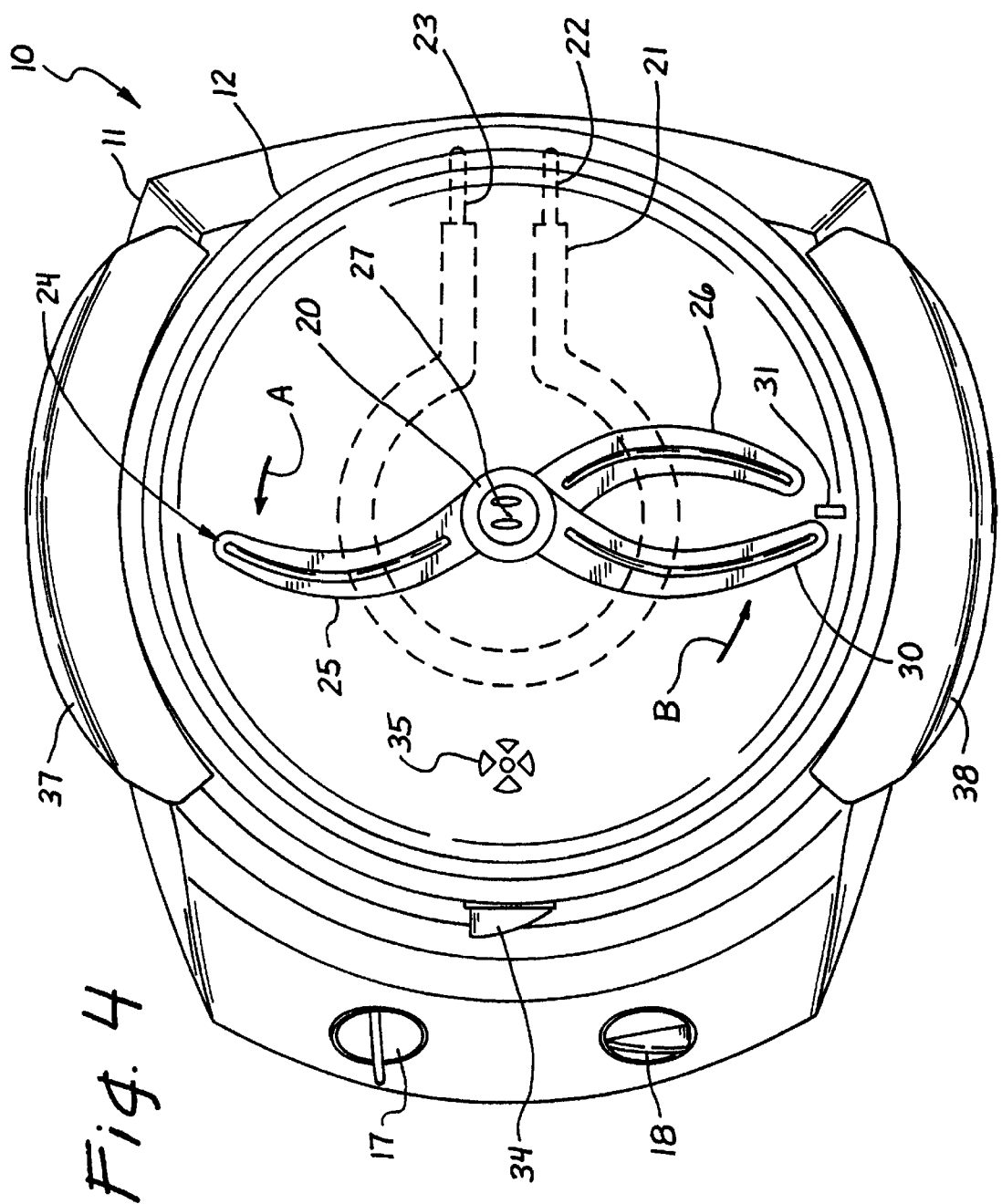
FIG. 4 is a plan view showing additional aspects of the stirrng mechanism.
Figure 5:
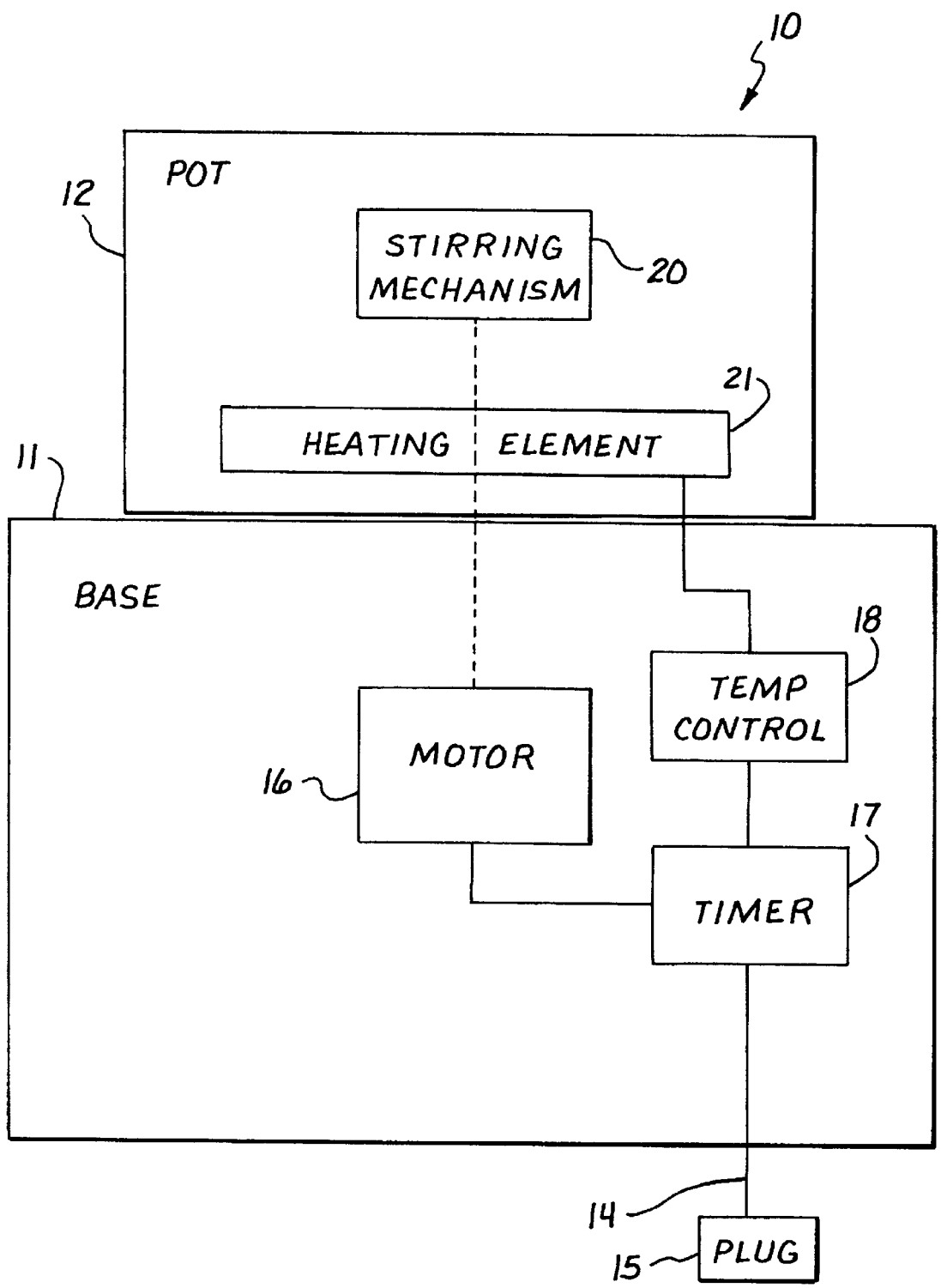
FIG. 5 is a block diagram showing the interconnection of mechanical and electrical components.

With the plug 15 plugged into an electric outlet, the cook manipulates the timer 17 on the base 11 (FIGS. 1, 2, 4, and 5) in order to couple the electric line 14 to the motor 16 for a desired period of time. The motor 16 then rotates, with rotational motion from the motor 16 being coupled from a motor shaft 19 (FIGS. 2 and 3) to a stirring mechanism 20 on the pot 12 (FIGS. 2–5). The cook also manipulates the temperature control 18 on the base 11 (FIGS. 1, 2, 4, and 5) in order to couple the electric line 14 to a heating element 21 embedded in the pot 12 (FIGS. 4 and 5). The heating element 21 then heats the pot 12 and its contents according to the setting of the temperature control 18 as the stirring mechanism 20 stirs the contents. Stated another way, the heating element 21 is adapted to heat the pot 12 when the pot 12 is on the base 11 using electric power from the electric line 14.

The timer 17 may take the form of any of various known timing devices. It may even include a digital display and computer chip electronics (not shown). It functions to couple the electric line 14 to the motor 16 and the temperature control 18 according to a time setting the cook selects by manipulating the timer 17. The temperature control 18 may take the form of any of various known temperature control devices. It too may even include a digital display and computer chip electronics (not shown). It functions to couple the electric line 14 to the heating element 21 according to a temperature setting the cook selects by manipulating the temperature control 18 in order to thereby regulate the temperature of the heating element 21, the pot 12, and the contents of the pot 12.

The heating element 21 may take the form of any of various known heating elements. The illustrated heating element 21 is embedded in the pot 12 and provided with two prongs 22 and 23 (FIG. 4) that plug into mating connectors on the base 11 (not shown) when the pot 12 is placed on the base 11 in order to couple the heating element 21 to the temperature control 18. In other words, the heating element 21 is adapted to connect to the electric line 14 the pot 12 is placed on the base 11. The motor 16 may take the form of any of various known electric motors. It operates on household electricity to power the stirring mechanism 20. Any of various known coupling means may be used on the base 11 and the pot 12 to couple the motor shaft 19 to the stirring mechanism 20 when the pot 12 is placed on the base 11. Based upon the foregoing description and the drawings, one of ordinary skill in the art can readily construct the above-mentioned aspects of the cooking appliance 10 without the recitation in this description of all the particulars.

The stirring mechanism 20 includes a stirring element 24 having a first blade 25 and a second blade 26 (FIGS. 2, 3, and 4). The cook grasps a handle portion 27 of the stirring mechanism 20 (FIGS. 2, 3, and 4) and places the stirring mechanism 20 onto a coupling component 28 at the base of the pot 12 (FIGS. 2 and 3). Doing so couples the stirring element 24 to the motor shaft 19 when the pot 12 is on the base 11 so that the stirring element 24 rotates with the motor shaft 19 about a vertical axis 29 (FIG. 3) as depicted by an arrow A in FIG. 4. Stated another way, the stirring mechanism 20 on the pot 12 is adapted to connect to the motor 16 when the pot 12 is placed on the base 11 and to stir a quantity of packaged foods within the pot 12 using rotational power from the electric motor 16.

The stirring mechanism 20 also includes an opposing blade 30 that is adapted to cooperate with the first and second blades 25 and 26 in breaking up clumps of food in the pot 12. The illustrated opposing blade 30 is free-wheeling in the sense that is adapted to pivot about the axis 29 apart from the first and second blades 25 and 26 as depicted by an arrow B in FIG. 4. Clumps of food (not shown) caught by one of the first or second blades 25 and 26 of the stirring element 24 as the stirring element 24 rotates, bear against the opposing blade 30 and cause it to pivot until it contacts a stop 31 (FIGS. 3 and 4). When the opposing blade 30 contacts the stop 31, it stops so that the clumps of food are broken up between the opposing blade 30 and the first or second blades 25 and 26.

The illustrated stop 31 is simply a protrusion formed integrally with the pot 12. The opposing blade 30 extends radially sufficiently to contact the stop 31, while the first and second blades 25 and 26 extend radially a lesser distance so that they do not contact the stop 31. An opposing blade in the form of a counter-rotating blade or a more slowly rotating blade also works to break up clumps of food without departing from the inventive concepts claimed.

The pot 12 includes a see through lid 32 (e.g., glass) with a handle 33 (FIGS. 1–3). The pot 12 also includes a drain valve element 34 (FIGS. 1–4) that is pivotably and removably mounted on the pot 12 with a close-fitting friction fit. The cook pivots the drain valve element 34 to an open position during cooking in order to open a drain opening 35 in the pot 12 (FIGS. 3 and 4). Doing so provides a passageway for grease and other liquid to drain from the pot 12 through the drain opening 35 into a grease pan 36 (FIGS. 2 and 3) on the base 11 as depicted by two arrows in FIG. 3. The cook pivots the drain valve element 34 back to a closed position before removing the pot 12 from the base 11 and transporting it to the dining table using handles 37 and 38 on the pot 12. Stated another way, the base 11 includes a grease collection pan 36 and the pot 12 includes a drain valve element 34 adapted to be opened selectively to enable grease and/or other liquid to drain from the pot 12 into the grease collection pan 36.

The cook lifts the grease pan 36 (e.g., sheet metal pan) out of the base 11 for cleaning purposes. The cook also lifts the stirring mechanism 20 out of the pot 12 and withdraws the drain valve element 34 for cleaning purposes. These components all quickly and conveniently disassemble for cleaning and reassemble to ready the appliance 10 for its next use.

Thus, the invention provides a cooking appliance that significantly facilitates preparation of dry packaged foods and other stir-while-heating foods. The cooking appliance 10 includes (i) a base 11 with a motor 16, (ii) a pot 12 on the base 11 that is adapted to heat packaged foods electrically while on the base 11 and to be removed from the base 11 and set atop a table as a serving dish, and (iii) a stirring mechanism 20 on the pot 12 that is adapted to stir packaged foods in the pot 12 under power of the motor 16 when the pot 12 is on the base 11. As the heating element 21 heats ingredients of the pot 12, the motor 16 rotates the stirring mechanism 20.

The stirring mechanism 20 stirs the ingredients unattended. This frees the cook to focus more on other household activities. The pot 12 is removable from the base 11 so that it also serves as a separate serving dish. No need to bring the whole appliance 10 to the dining table. No need to transfer the contents of a skillet to a separate serving dish. The stirring element 24, timer 17, and temperature control 18 augment the foregoing, and components of the cooking appliance 10 quickly disassemble for cleaning and reassemble for the next use. Although an exemplary embodiment has been shown and described, one of ordinary skill in the art may make many changes, modifications, and substitutions without necessarily departing from the spirit and scope of the invention.

What is claimed is:

1. A cooking appliance, comprising:
   a base functioning as means for supporting components of the cooking appliance upon a horizontal countertop surface, the base having an electric line adapted to be plugged into a source of household electricity and an electric motor connected to the electric line;

a pot adapted to be placed removably upon the base, to hold a quantity of packaged foods for food preparation purposes, and to be used apart from the base as a serving dish;

an electric heating element adapted to heat the pot when the pot is on the base using electric power from the electric line; and a stirring mechanism on the pot adapted to connect to the motor when the pot is placed on the base and to stir the quantity of packaged foods within the pot using rotational power from the electric motor;

wherein the stirring mechanism includes a stirring element that is adapted to route under power of the motor and an opposing blade; and wherein the stirring mechanism and the opposing blade are so adapted that the stirring element rotates past the opposing blade in order that the stirring element and the opposing blade can cooperatively break up clumps of food between them.

2. A cooking appliance as recited in claim 1, further comprising at least one stop component on the pot that is adapted to block rotation of the opposing blade so that the second stirring element can not rotate a full 360 degrees with the result that the first stirring element can rotate past the second stirring element.

3. A cooking appliance as recited in claim 1, wherein the base includes a temperature control adapted to automatically control the temperature of the heating element.

4. A cooking appliance as recited in claim 1, wherein the base includes a timer control adapted to automatically control the length of time the cooking appliance operates.

5. A cooking appliance, comprising:

a base functioning as means for supporting components of the cooking appliance upon a horizontal countertop surface, the base having an electric line adapted to be plugged into a source of household electricity and an electric motor connected to the electric line;

a pot adapted to be placed removably upon the base, to hold a quantity of packaged foods for food preparation purposes, and to be used apart from the base as a serving dish;

an electric heating element adapted to heat the pot when the pot is on the base using electric power from the electric line; and a stirring mechanism on the pot adapted to connect to the motor when the pot is placed on the base and to stir the quantity of packaged foods within the pot using rotational power from the electric motor;

wherein the base includes a grease collection pan and the pot includes a drain valve element adapted to be opened selectively to enable grease to drain from the pot into the grease collection pan.

6. A cooking appliance as recited in claim 1, wherein the heating element is embedded in the pot and adapted to connect to the electric line when the pot is placed on the base.

7. A cooking appliance as recited in claim 1, wherein the stirring mechanism is adapted to connect to the motor when the pot is placed on the base.

8. A cooking appliance, comprising:

a base functioning as means for supporting components of the cooking appliance upon a horizontal countertop surface, the base having an electric line adapted to be plugged into a source of household electricity, an electric motor connected to the electric line, and a timer control adapted to automatically control the length of time the cooking appliance operates;

a pot adapted to be placed removably upon the base, to hold a quantity of packaged foods for food preparation purposes, and to be used apart from the base as a serving dish;

an electric heating element embedded in the pot, the electric heating element being adapted to connect to the electric line when the pot is placed on the base and to heat the pot when the pot is on the base using electric power from the electric line; and a stirring mechanism on the pot adapted to connect to the motor when the pot is placed on the base and to stir the quantity of packaged foods within the pot using rotational power from the electric motor, the stirring mechanism including a stirring element and an opposing blade that are so adapted that the stirring element rotates past the opposing blade in order that the first and second stirring elements can cooperatively break up clumps of food between them.

\* \* \* \* \*